US007571446B2

(12) United States Patent
Seki et al.

(10) Patent No.: US 7,571,446 B2
(45) Date of Patent: Aug. 4, 2009

(54) SERVER, COMPUTER SYSTEM, OBJECT MANAGEMENT METHOD, SERVER CONTROL METHOD, COMPUTER PROGRAM

(75) Inventors: Naishin Seki, Yokohama (JP); Akio Yajima, Sagamihara (JP); Shinichi Hirose, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 10/474,616

(22) PCT Filed: Apr. 17, 2002

(86) PCT No.: PCT/JP02/03842

§ 371 (c)(1),
(2), (4) Date: Mar. 15, 2004

(87) PCT Pub. No.: WO02/086736

PCT Pub. Date: Oct. 31, 2002

(65) Prior Publication Data

US 2004/0172630 A1    Sep. 2, 2004

(30) Foreign Application Priority Data

Apr. 19, 2001    (JP)    .............................. 2001-121813

(51) Int. Cl.
*G06F 13/00*    (2006.01)
(52) U.S. Cl. ...................... 719/330; 709/201; 709/202; 709/203; 709/217; 709/218; 709/219
(58) Field of Classification Search ................. 719/330; 709/201, 202, 203, 217, 218, 219
See application file for complete search history.

(56) References Cited

U.S. PATENT DOCUMENTS

| | | | | |
|---|---|---|---|---|
| 5,754,939 A | * | 5/1998 | Herz et al. | ................. 455/3.04 |
| 5,787,471 A | * | 7/1998 | Inoue et al. | ................. 711/133 |
| 5,796,952 A | * | 8/1998 | Davis et al. | ................. 709/224 |

(Continued)

FOREIGN PATENT DOCUMENTS

CA    2 308 282 A1    12/2000

(Continued)

OTHER PUBLICATIONS

Yoshizawa, Yasufumi and Kinoshita, Toshiyuki. "An analysis of User Behavior and Demand Swapping Policies in Time-Sharing Systems". Journal of Information Processing, Tokyo. JP, vol. 12, No. 2, 1989, pp. 125-138.*

(Continued)

*Primary Examiner*—Andy Ho
(74) *Attorney, Agent, or Firm*—Vazken Alexanian

(57) ABSTRACT

It is one object of the present invention to provide a server, a computer system that can efficiently operate a server, an object management method and a server control method. For each web page that is presented to a user terminal, a server predicts the times whereat users will issue the next requests, i.e., the times NA whereat objects held by the server will be used, and manages objects stored in the main storage based on predicted use times NA. In the process employed for swapping an object out of the main storage, basically the object is swapped out whose predicted use time NA is the latest.

34 Claims, 15 Drawing Sheets

U.S. PATENT DOCUMENTS

| | | | | |
|---|---|---|---|---|
| 5,802,292 | A * | 9/1998 | Mogul | 709/203 |
| 5,878,223 | A * | 3/1999 | Becker et al. | 709/223 |
| 5,925,100 | A * | 7/1999 | Drewry et al. | 709/219 |
| 6,038,601 | A * | 3/2000 | Lambert et al. | 709/226 |
| 6,425,058 | B1 * | 7/2002 | Arimilli et al. | 711/134 |
| 6,654,766 | B1 * | 11/2003 | Degenaro et al. | 707/104.1 |
| 6,981,017 | B1 * | 12/2005 | Kasriel et al. | 709/203 |
| 6,983,318 | B2 * | 1/2006 | Doyle | 709/223 |
| 7,418,518 | B2 * | 8/2008 | Grove et al. | 709/238 |
| 2002/0023145 | A1 * | 2/2002 | Orr et al. | 709/219 |

FOREIGN PATENT DOCUMENTS

| | | |
|---|---|---|
| JP | PUPA 59-207479 | 11/1984 |
| JP | PUPA H07-36831 | 2/1995 |

OTHER PUBLICATIONS

Kraiss, Achim and Weikum, Gerhard. "Integrated document caching and prefetching in storage hierarchies based on Markov-chain predictions". The VLDB Journal, No. 7, 1998, pp. 141-162.*

Weilkum, Gerhard; Konig, Arnd Christian; Kraiss, Achim; and Sinnwell, Markus. "Towards Self-Tuning Memory Management For Data Servers". Data Engineering Bulletin, vol. 22, No. 2, 1999, pp. 3-11.*

Yoshizawa, Yasufumi; Arai, Toshiaki; Kubo, Takashige; and Shinozaki, Toshiharu. "Adaptive Storage Control For Page Frame Supply in Large Scale Computer Systems". Proceedings of the 1988 ACM SIGMETRICS conference on Measurement and modeling of computer systems, p. 235-243.*

Yoshizawa Y et al:An Analysis of User Behavior and Demand Swapping Policies in Time-Sharing Systems Journal of Information Processing, Tokyo JP vol. 12 No. 2 1989 p. 125-138, XP00903912 p. 125-126 Section 1 Introduction p. 130-131 Section 3.2.Damand Swapping Algorithms.

Wang J:"A Survey of Web Caching Schemes for the Internet" Computer Machinery, New York, US. vol. 29, No. 5 Oct. 1999,pp. 36-46, XP000927253 ISSN: 0146-4833 p. 41, section 4.4 Cache placement/replacement p. 42, section 4.6 Caching contents p. 42, section 4.7 user access pattern prediction.

* cited by examiner

Fig. 14

| Average access count/minute | 350 | 403 | 489 | 627 | 749 | 829 | 924 |
|---|---|---|---|---|---|---|---|
| Relative reduction rate for LRU algorithm | 0.000 | −0.002 | 0.008 | 0.240 | 0.435 | 0.711 | 0.736 |

US 7,571,446 B2

SERVER, COMPUTER SYSTEM, OBJECT MANAGEMENT METHOD, SERVER CONTROL METHOD, COMPUTER PROGRAM

CROSS REFERENCE AND PRIORITY

This application filed under 35 USC 371, is cross-referenced with, and claims priority from, International Patent Application PCT/JP02/03842 filed on Apr. 17, 2002, under PCT article 21(2), which in turn claims priority of 2001-121813 filed on Apr. 19, 2001.

TECHNICAL FIELD

The present invention relates to a server, a computer system, an object management method and a server control method that are appropriate to be used for a process using objects.

BACKGROUND

As is well known, networks such as the Internet and local area networks (LANs) have recently become popular. Across these networks, servers perform various processes requested by user terminals.

Specifically, web servers intended to provide services across networks permit user terminals to sequentially display web pages to navigate the steps for a service, receive requests made on the web pages, and perform processes requested by users. As an example, a server for Internet banking permits a user terminal to display a log-in page, and asks the user to enter a log-in ID and a password. After the entry of the log-in ID and the password, the server permits the user terminal to display a menu page, receives an item on the menu page selected by the user, and advances to a web page corresponding to the selected item, for example, "money transfer". When the user enters the account number of the destination and the amount to be transferred, the server permits the user terminal to display a transfer confirmation page. Then, when the server receives the user's confirmation of the transfer, the server performs the designated process, i.e., a money transfer process.

A server, which performs this process sequence or a so-called session, often employs a method of using an object for each user in order to process user requests. The object is used by the server to collectively manage data related to a session, i.e., user data, such as the log-in ID of a user, that is registered in advance, the contents of a process request, the process results, log data, such as process history, and the data that is generated during a session and is required for the following processes. An object is generated when a user performs the first session on the server, and at the second and following sessions, the same object is used, so that a continuous service can be provided based on the preceding sessions.

The server includes, as data storage units, a memory device that constitutes the main storage and one or more hard disk drives that constitute the auxiliary storage, and the objects for individual users are appropriately sorted and stored either in the main storage or on the auxiliary storage. Based on the log-in ID that is entered by the user, the server retrieves, from the main storage or the auxiliary storage, an object corresponding to the user, and performs requested processes. Naturally, the response is slower when an object is stored on the auxiliary storage, that is, on a hard disk drive, because of the time that is necessary for retrieval.

Since the memory capacity of the server is physically limited, the number of objects that can be stored in the main storage is accordingly limited. Therefore, when an object is to be retrieved from an auxiliary storage and loaded into the main storage, or when a new object is to be generated in the main storage, if there is not enough free space in the main storage, some of the objects currently stored in the main storage are moved to the auxiliary storage to provide additional free memory space, and the object retrieved from the auxiliary storage is stored therein. This movement of objects from the main storage to an auxiliary storage is called swap-out. While the retrieval of objects, from an auxiliary storage into free space in the main storage, is called swap-in.

Conventionally, the LRU (Least Recently Used) method is often employed for the management of objects in the main storage. According to the LRU method, the objects are swapped out of the main storage beginning with the object for which the time of its preceding use (the last time used) is the oldest.

For example, FIG. 15A is a diagram showing the array of objects (J1 to J8) stored in the main storage at a specific time, beginning at the left with the object for which the last use time is the latest. Upon receiving a process request from a user, the corresponding object (J5) is used, the last use time for the object (J5) is updated, and the position of the object (J5) in the array is changed, as is shown in FIG. 15B. That is, since the object (J5) was recently used for the process and its last use time is the latest, it comes first in the array (left end in FIG. 15B). Further, when swapping out of objects is to be performed because free memory space is insufficient for the generation of a new object (not shown) or the retrieval of an object from an auxiliary storage, as is shown in FIG. 15C, of the objects (J1) to (J8) currently stored in the main storage, the object (J8), for which the last use time is the oldest is swapped out, and moved out of the main storage to the auxiliary storage.

Another method for managing objects in the main storage is a method whereby the access frequency history is employed for selecting an object to be swapped out (e.g., Japanese Unexamined Patent Publication No. Hei 6-4316). According to this method, unlike the above method whereby the object for which the last use time is the oldest is swapped out, an object for which the access frequency (e.g., the total of in-use time) per unit time (e.g., the time that has elapsed since the object was swapped in) is the least is swapped out.

PROBLEMS TO BE SOLVED BY THE INVENTION

However, according to the above described former methods, a server, especially one that provides a service for many users, may not always efficiently perform memory management. For example, for provision of a service for several ten thousands to several hundred thousands of users, a server may receive 500 or more process requests every minute. When a user accesses such a server and when the user is performing a process sequence consisting of multiple steps along the web pages that are sequentially displayed as a result of the data entry by the user, e.g., is reading a specific web page, it may be necessary for the object of the user to be swapped out of the server's main storage if the server has received many process requests from other users. In such a case, when the user has read a web page and has posted data to move to the next web page, the server must swap the user's object in the main storage, so that the display of the next page is delayed. Accordingly, there may be a noticeable response delay and the user may become dissatisfied with the service provided by the server. Therefore, it is demanded that service providers eliminate the occurrence of such delays, and as a consequence, continuing studies of many methods, including methods for responding to requests quickly, have been conducted for reducing the loads imposed on servers and for ensuring the servers are operated efficiently.

To resolve the technical shortcomings, it is one object of the present invention to provide a server, a computer system for efficiently operating a server, an object management method and a server control method.

SUMMARY OF THE INVENTION

To achieve the above object of the invention, upon receiving a request from a user via a network, the processing means of a server uses an object stored in first object storage means, such as a semiconductor memory device, and performs a predetermined process. Use time prediction means predicts a use time whereat a currently used object is to be used by the processing means the next time. Based on the predicted use time, objects are transferred from the first object storage means to second object storage means, such as an auxiliary storage. Specifically, when an object stored in the first object storage means need to swapped out, of the currently stored objects, the object for which the predicted use time is the latest is swapped out, and is moved to the second object storage means. As a result, objects for which the predicted use time is the earliest are maintained in the first object storage means.

When the use time for an object is predicted for each user, the skills of the individual users can be taken into account. And when the use time for an object is predicted for each of multiple steps constituting the process sequence, the process contents at individual steps (for either simple or complicated processes) can be taken into account.

Objects for which the predicted use times have passed may be transferred from the first object storage means to the second object storage means.

In a computer system according to the present invention, after a data output unit outputs data, a time prediction unit predicts a use time whereat the object that have been used is to be used next by a processing unit to perform processes in accordance with requests, from user terminals, that are received by a request acceptance unit. Then, based on the time predicted by the time prediction unit, an object management unit manages the object stored in the main storage.

The data output unit, the request acceptance unit, the main storage, the processing unit, the object management unit, and the time prediction unit may be provided integrally for a server. These components may also be separately distributed among multiple computers, so a system that is composed of computers collectively functions as a server.

The period of time required from the data output to a user terminal by the data output unit until the next use of the object may be stored in a time data accumulation unit, so that the use time for a specific user can be predicted based on the time data accumulated for multiple users and those time data for the specific user.

More specifically, for example, in the distribution of time data that have been accumulated, the index for a user for whom the time is to be predicted can be set by an index setting unit, and can be used to predict the use time for the user. Further, when only the latest time data for multiple users accumulated within a fixed time are employed, a time prediction can be made while taking into account fluctuation over time.

According to the invention, an object management method comprises steps of: predicting the time at which each object stored in a main storage is to be used next; and when an object in the main storage must be swapped out, selecting from among objects in the main storage an object for which the predicted time is the latest and swapping the selected object out. Fluctuation over time can also be taken into consideration when predicting a time.

According to the invention, a server control method comprises the steps of: accumulating response time data for a period extending from the output of process results in accordance with a process request by a user who has accessed a server via a network until a response is received from the user; employing the accumulated response time data to predict the time a response to the results that are output is received from the user; and swapping out an object from the main storage based on the predicted time.

At this time, in the distribution of the response time data not only for a pertinent user but also for other users, an index indicating the relative position of the response time data accumulated for the user can be set and can be employed for the prediction of a time. For a user for whom an index has not been set, the time may be predicted based on a predetermined reference index, such as a default value. The index may also be updated each time response time data is accumulated, i.e., each time a user responds and a corresponding object is used.

According to the present invention, a computer program permits a computer, such as a server, to perform: a process for detecting a processing request command received from an external terminal; a process for predicting a time whereat the next process request command from the external terminal will be input as a response to the processing result that are output; and a process for managing objects, that is required to perform a process in accordance with the next request process command, by employing the predicted time.

BRIEF DESCRIPTION OF THE DRAWINGS

FIG. 12A is a diagram showing an object array in its initial state.

FIG. 12B is a diagram showing the state wherein an object is fetched and processed.

FIG. 12C is a diagram showing the state wherein an object whose use time has been predicted has been swapped in.

FIG. 14 is a diagram showing the simulation results.

DETAILED DESCRIPTION OF THE INVENTION

The preferred embodiment of the present invention will now be described in detail while referring to the accompanying drawings.

Figure 1:
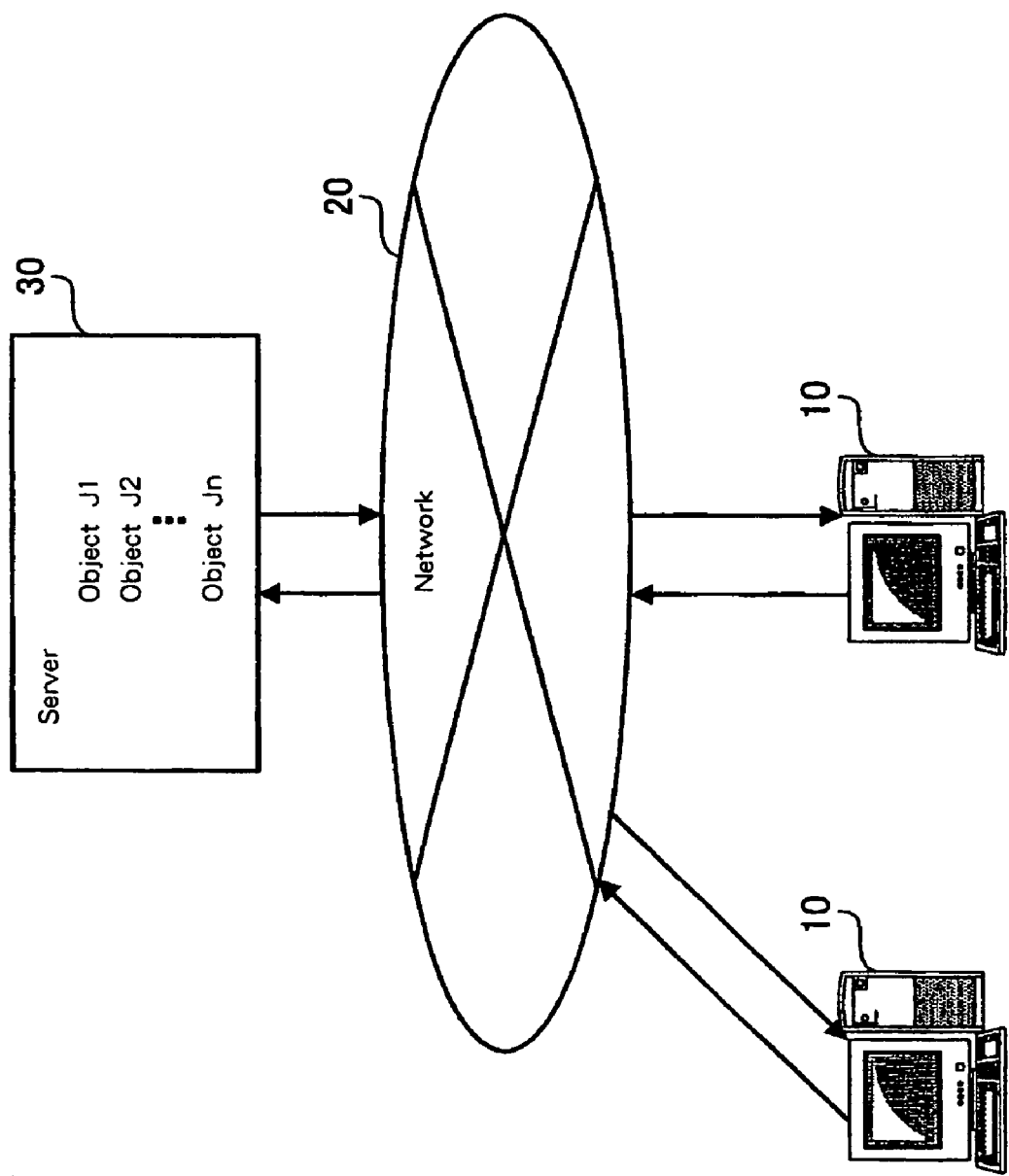
FIG. 1 is a diagram showing a system configuration according to one embodiment of the present invention.

FIG. 1 is a diagram explaining a system configuration according to the embodiment of the invention. As is shown in FIG. 1, multiple user terminals 10 are connected via a network 20, such as the Internet or a LAN, to a server (a computer system or a computer) 30 of a service provider. The terminals 10 are so-called PCs (Personal Computers), and need only comprise: a function for receiving data from the server 30 via the network 20; a browser function for displaying on the display screen of a monitor an image based on received data; a data input function, such as is provided by a pointing device or a keyboard, that enables a user to enter information and a request based on the contents of the display screen; and a function for transmitting to the server 30 via the network 20, the information entered using the data input function.

Figure 2:
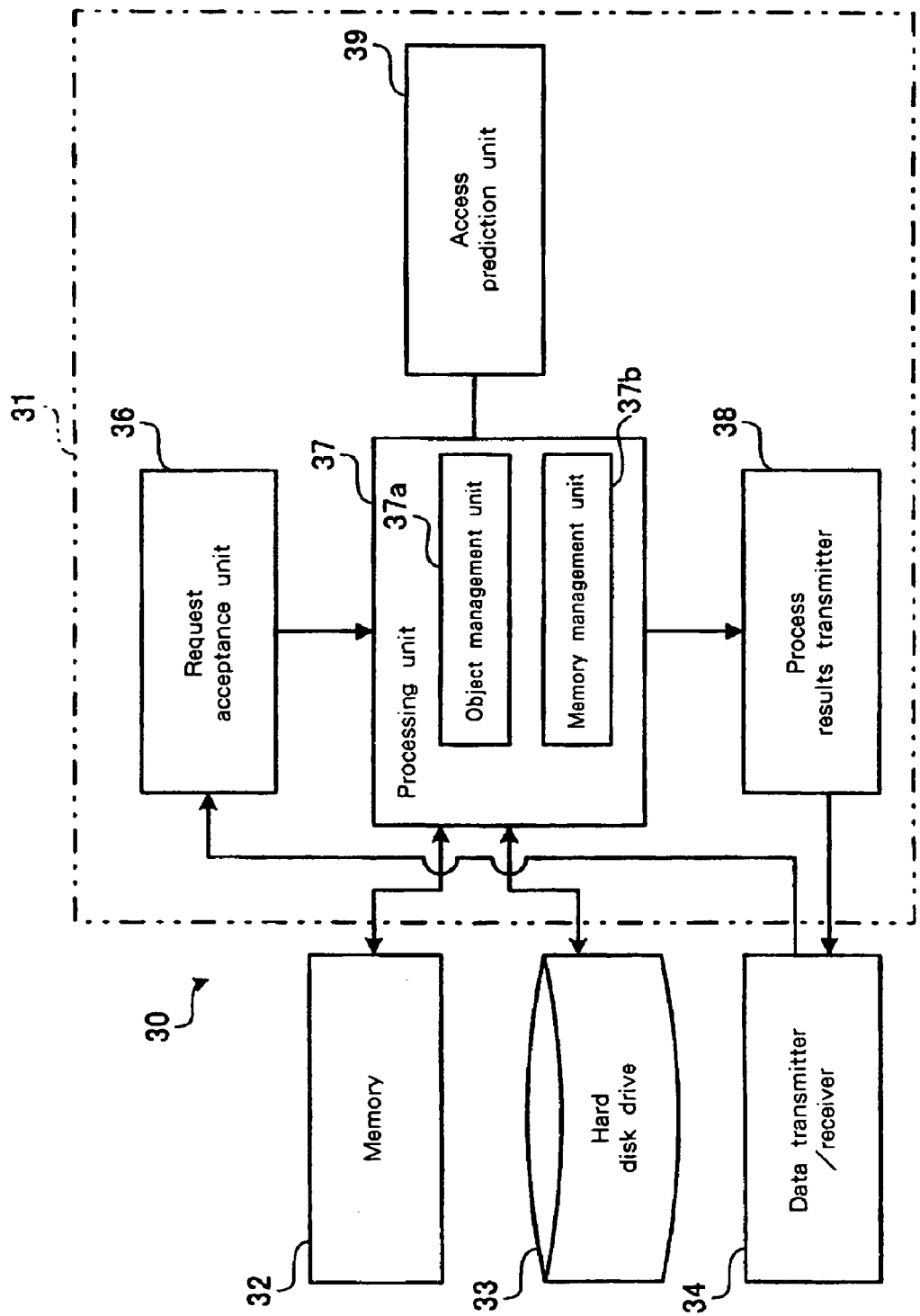
FIG. 2 is a diagram showing the configuration of a server for object management.

As is shown in FIG. 2, the server 30 comprises: a control block 31, for performing a process based on CPU instructions (not shown) based on a control program that is installed in advance; a memory (first object storage means, or main storage device) 32, such as a DRAM (Dynamic Random Access Memory); a hard disk drive (second object storage means or auxiliary storage device) 33; and a data transmitter/receiver 34, for transmitting and receiving data via the network 20.

The control block 31 includes: a request acceptance unit 36, for accepting a request that is issued by an external terminal 10 and received, via the network 20, by the data transmitter/receiver 34; a processing unit (processing means) 37, for performing a process in accordance with the received request; and a process result transmitter (data output unit) 38, for transmitting to the terminal 10 the process result obtained by the processing unit 37 via the data transmitter/receiver 34 and the network 20.

The processing unit 37 includes: an object management unit 37a, for retrieving a required object from the memory 32, or for generating a new object, in order to perform a process in accordance with the request; a memory management unit (object management means, or an object management unit) 37b, for managing objects in the memory 32, e.g., swapping out an object from the memory 32 to the hard disk drive 33, or swapping in an object from the hard disk drive 33 to the memory 32.

Further, when the objects are managed by the memory management unit 37b, the processing unit 37 predicts the next time an access will occur during the process sequence session performed for a user. Therefore, the control block 31 further comprises an access prediction unit (use time prediction means or a time prediction unit) 39.

Since the server 30 performs the process requested by the user as a series of multiple steps, the server 30 provides, as so-called homepages, for the user's terminal 10, connected via the network 20 to the server 30, web pages that correspond to the individual steps of the process. For example, for Internet banking, in accordance with an entry received from the user terminal 10, the server 30 sequentially presents a web page for accepting log-in ID and password entries, a web page for accepting a process menu (e.g., a money transfer or an account balance inquiry) selected by a user following the log-in, a web page for accepting the entry of information (e.g., an account number for the money transfer destination, and the amount of money to be transferred) that is required for the execution of a process in accordance with the selected process menu, a web page for receiving from the user a confirmation for the process contents, and a web page for providing notification that the process has been completed.

In the server 30, therefore, based on a process request command and parameters that are included in the request (request contents data) received by the request acceptance unit 36, the processing unit 37 performs a predetermined process and presents the results to the user, and the process result transmitter 38 transmits data for a web page that permits the user to enter the request contents for the next process step.

In this case, the data for displaying the web pages on the terminal 10 is stored on the hard disk drive (or another storage device) 33 of the server 30. The process results transmitter 38 reads, from the hard disk drive 33, data for a web page to be transmitted, e.g., HTML (Hypertext Markup Language) data, and the data transmitter/receiver 34 transmits this data, together with process result data provided by the processing unit 37, to the terminal 10 via the network 20.

The access prediction unit 39 predicts the time each user will access the next web page to each web page presented by the server 30. Specifically, a response time $\alpha$ is predicted that extends from the time whereat the server 30 transmits the data for a web page to the time (use time: hereinafter referred to as a use prediction time NA) whereat the terminal 10, which receives the data, displays the web page and the user, by reading the web page and completing the requested items thereon, transmits to the server 30, via the terminal 10, a command that the server 30 responds to by using an object for the user.

This is necessary because there is a great difference in the response times $\alpha$ required by users when reading a page, even the same page, and entering required data. The time required differs depending on the skills of the users, i.e., the practice they have had in using PCs, on whether the users have previously visited the web page presented by the server 30 and the frequency of such visits, and the users' reading and character input speeds. Further, when multiple web pages are presented, the response time $\alpha$ also differs even for the same user, and depends on the contents of a web page; for example, whether a web page is one on which only a log-in ID and a password need be entered, or is one on which a number of sentences, such as the rules for use, must be read or is one for which many entries are required. In addition, since the number of users of the network 20 and the server 30 will differ greatly, depending on the time period, such as late at night, early in the morning or during the daytime, the response time $\alpha$ will be affected by the transfer speed of the network 20 and the processing speed of the server 30.

Figure 3:
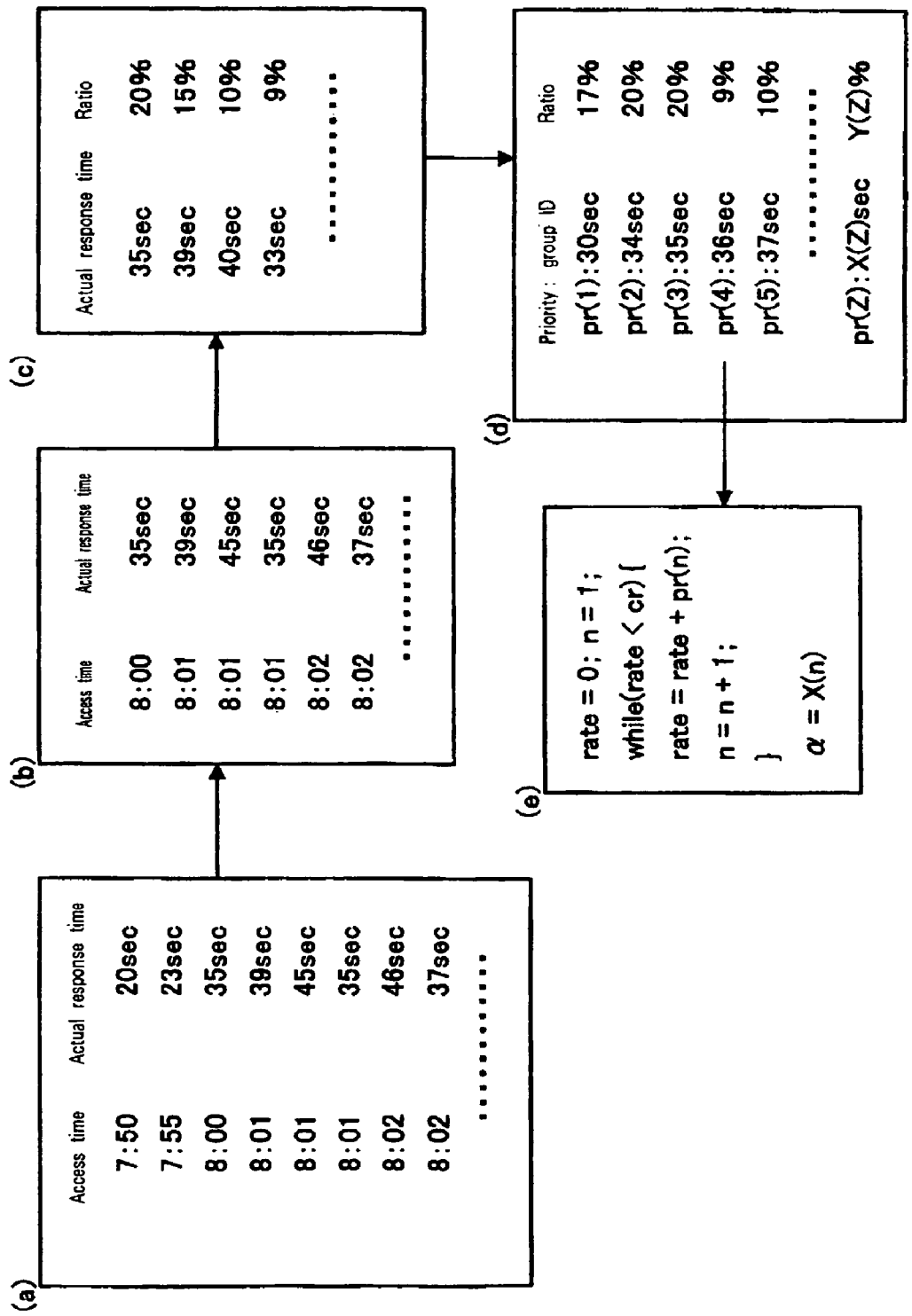
FIG. 3 is a diagram showing the process for generating a probability distribution using actual response times accumulated for accesses by an individual user, and for setting a characteristics parameter for each user.

In the server 30, for all users, as is shown in FIG. 3A, the access time for each web page presented by the server 30 and the history data (time data) of the response time $\beta$ that was actually required for each user are stored in the history data storage unit (time data accumulation unit) in the memory 32 or the hard disk drive 33. The actual response time $\beta$ is the time duration required from the transmission by the server 30 of the data for each web page to the actual use of an object for processing the next request received from the user. The actual response time β is stored in the history data storage unit after quantization to seconds, for example (digitization), has been performed.

Figure 4:
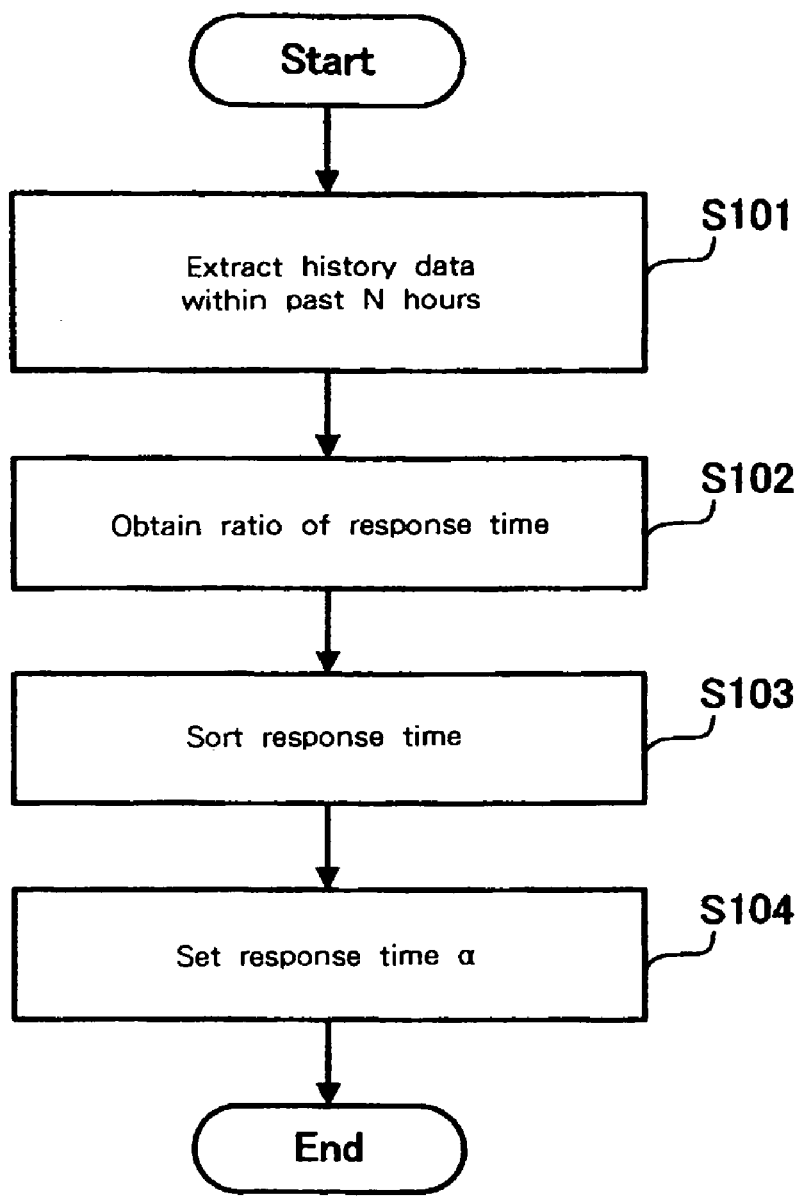
FIG. 4 is a flowchart showing the processing for setting the response time for a user.

FIG. 4 is a flowchart for the processing performed by the access prediction unit 39 to predict the response time α. First, immediately after the server 30 is activated, as is described above, for all the users who have accessed the server 30, the process results transmitter 38 transmits the data for a web page (output step), and the actual response time β, which is the time required for a response to the web page to be transmitted by the user terminals 10, is measured and is stored with the access time in the history data storage unit (not shown) (data accumulation step).

When in accordance with a request from a user the server 30 transmits the data for a web page to a user terminal 10 via the network 20, first, the history data for the processes that were performed for the same web page during the past predetermined N hours (in this embodiment, N=1 and is hereinafter referred to as the past hour) is extracted from the history data storage unit (not shown) (step S101). In FIG. 3B, at the current time, 9:00, for example, the history data for the processes that were performed during the past hour, i.e., after 8:00, are extracted.

Then, based on the extracted history data, the probability distribution (the distribution of time data) of the actual response time β for the web page during the past hour is calculated. Specifically, as is shown in FIG. 3C, the actual response times β are grouped for each of multiple steps, for example, for each second. The number of accesses (users) pertinent to the groups is obtained, and the ratio of each group to the total access is calculated (step 102). Further, as is shown in FIG. 3D, these groups are sorted in the ascending order of the group IDs that are represented by the actual response times β, and the priority pr(n) is set for each group in accordance with the sorting order (step 103).

Figure 5:
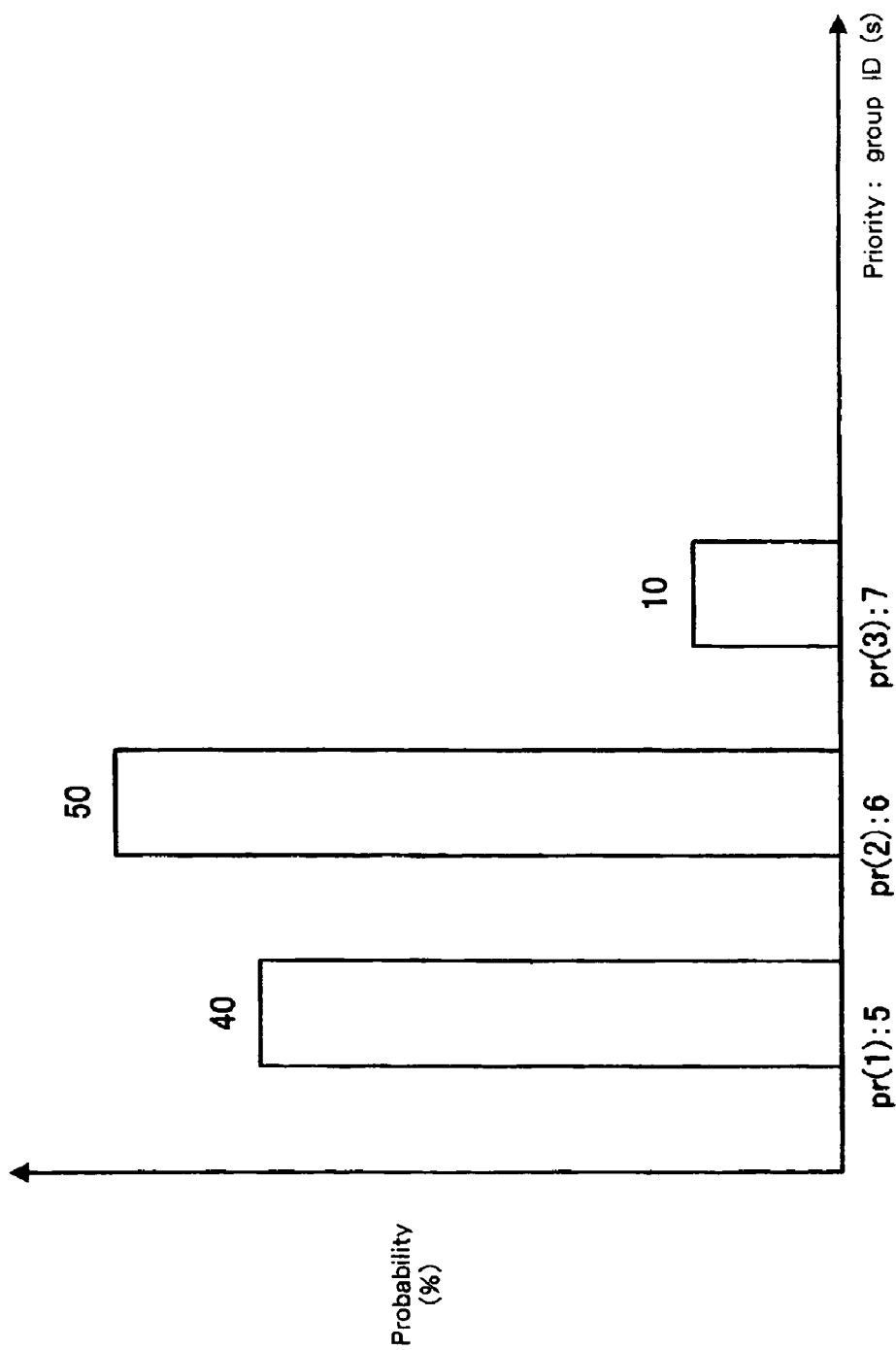
FIG. 5 is a graph showing an example probability distribution.
Figure 6:
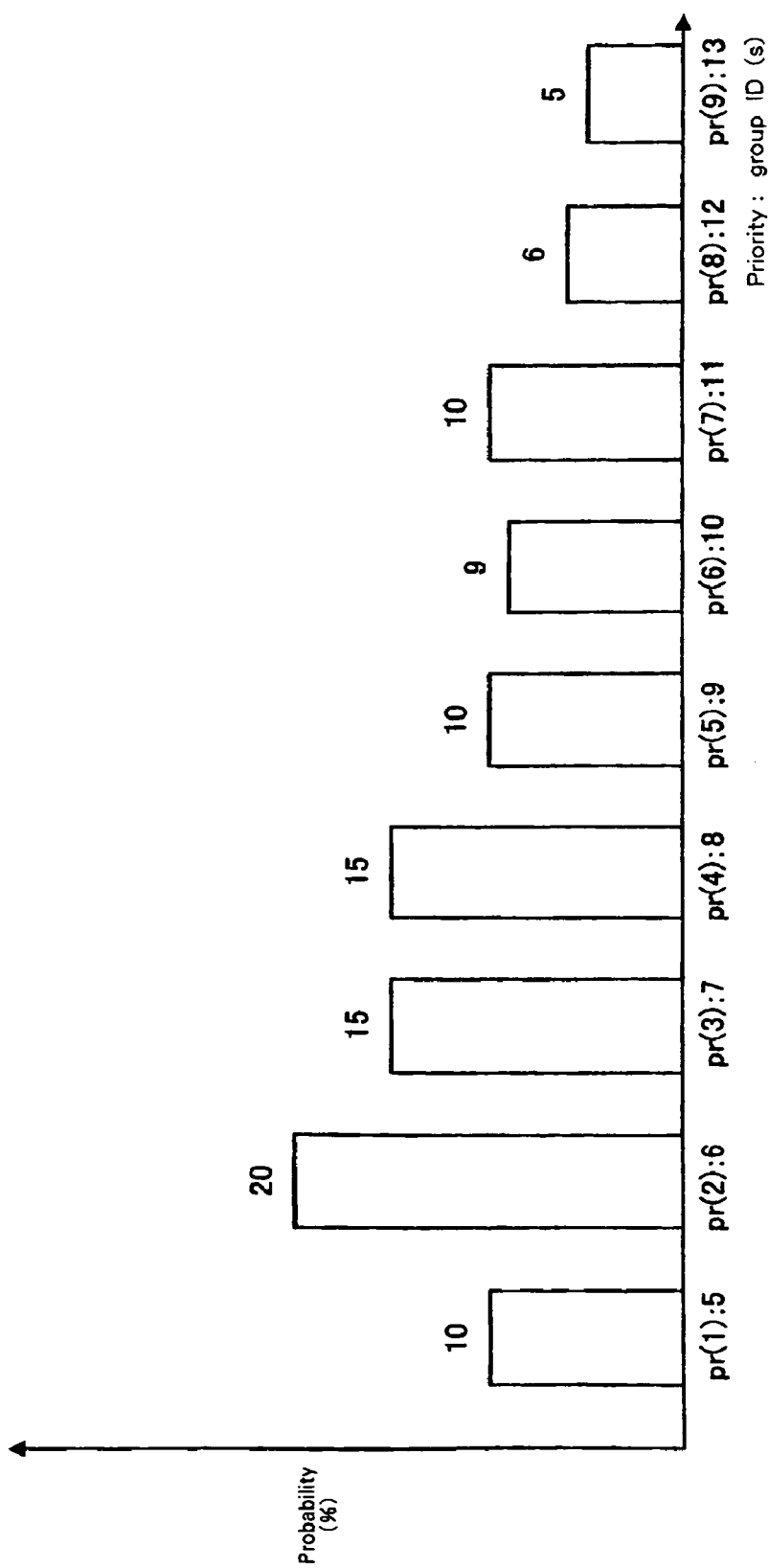
FIG. 6 is a graph showing another example probability distribution.
Figure 7:
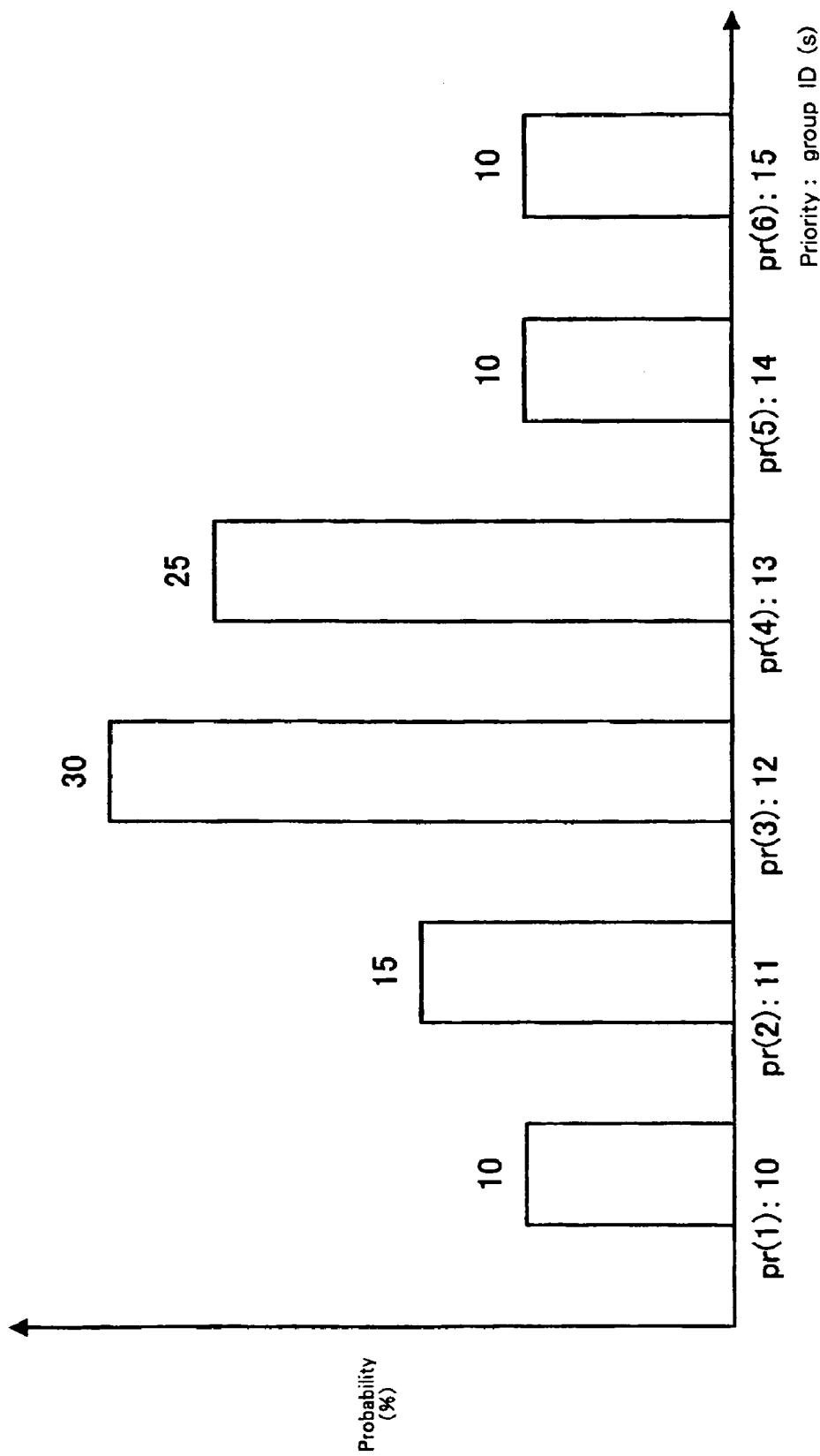
FIG. 7 is a graph showing an additional example probability distribution.

Examples for the thus obtained probability distribution are shown in FIGS. 5 to 7. FIG. 5 is a graph showing the probability distribution of the actual response times β for multiple users for a web page that includes simple input items for entries to be made at a user terminal 10. FIG. 6 is a graph showing the probability distribution for a web page containing complicated input items. FIG. 7 is a graph showing the probability distribution for a web page that includes input items that are not as simple as those in FIG. 5 and not complicated as those in FIG. 6. Since the input items are simple, in the probability distribution shown in FIG. 5, the variance in the response times β for all users is small. Whereas, in the probability distributions in FIGS. 6 and 7, because of many entry items, a great difference in response time appears that is due to differing skills in the use of PCs, to reading speeds for sentences and to familiarity with the web pages, and the variance in the probability distribution is larger.

The access prediction unit (index setting unit) 39 is so designed that it predicts a response time α of a user based on the probability distribution of the actual response time β. For this prediction, in this embodiment, a characteristics parameter (index) cr is employed that represents the position (rate) of the actual response time β for a user in the probability distribution of the actual response time β. The characteristics parameter cr indicates the relative position of the user as measured from the side of the probability distribution where a priority pr(n) (an actual response time β) is small.

Until the accesses by a user have reached a predetermined number of times, the default value (standard index) held in advance by the access prediction unit 39, i.e.,cr=90%, is employed as the characteristics parameter cr. Then, when the accesses by the user have reached the predetermined number of times, the characteristics parameter cr for the user is set based on the actual response times β that have been accumulated for the user. For example, based on the characteristics parameter cr for the actual response times β for a user relative to the past five accesses, the average value of the characteristics parameter cr, excepting the largest and the smallest variables, is set as the characteristics parameter cr for the user (index setting step). It is preferable that this characteristics parameter cr be set each time an actual response time β is accumulated for a user, i.e., each time an object is used, and that it be updated in real time.

In order to predict the response time α for a user, beginning at the small priority pr(n) side, the rate (the rate for the number of accesses) for the groups are accumulated based on the equations in FIG. 3E, and when the accumulated value (hereinafter referred to as an accumulated rate: %) is equal to or greater than the characteristics parameter cr, the group ID of the current priority pr(n) is defined as the response time α for the user (step S104).

As a specific example, in the probability distribution in FIG. 7, the response time α for a user whose characteristics parameter cr is set as 75% is predicted to be "13 seconds", because the group ID for the priority pr(n) when the accumulated rate is equal to or greater than 75% is 13 seconds (in FIG. 7, the rates are accumulated as 10%+15%+30%+25%=80%, beginning at the side of the probability distribution where the priority pr(n) is small). Similarly, in the probability distribution in FIG. 5, a response time α of six seconds is predicted both for a user whose characteristics parameter cr is set as 50% and a user whose characteristics parameter cr is set as 80%. Further, in the probability distribution in FIG. 6, a response time α of eight seconds is predicted for a user whose characteristics parameter cr is set as 50%, and a response time α of eleven seconds is predicted for a user whose characteristics parameter cr is set as 80%.

Based on the thus predicted response time α for a user, the predicted time NA whereat an object is to be used to process the next user request is obtained using the following equation:

$$NA = T + \alpha$$

where T denotes the time whereat the server 30 transmits the data for each web page.

According to the above described method, the access prediction unit 39 predicts the time NA whereat an object is to be used to process the next user request, i.e., the next access time in a session.

Figure 8:
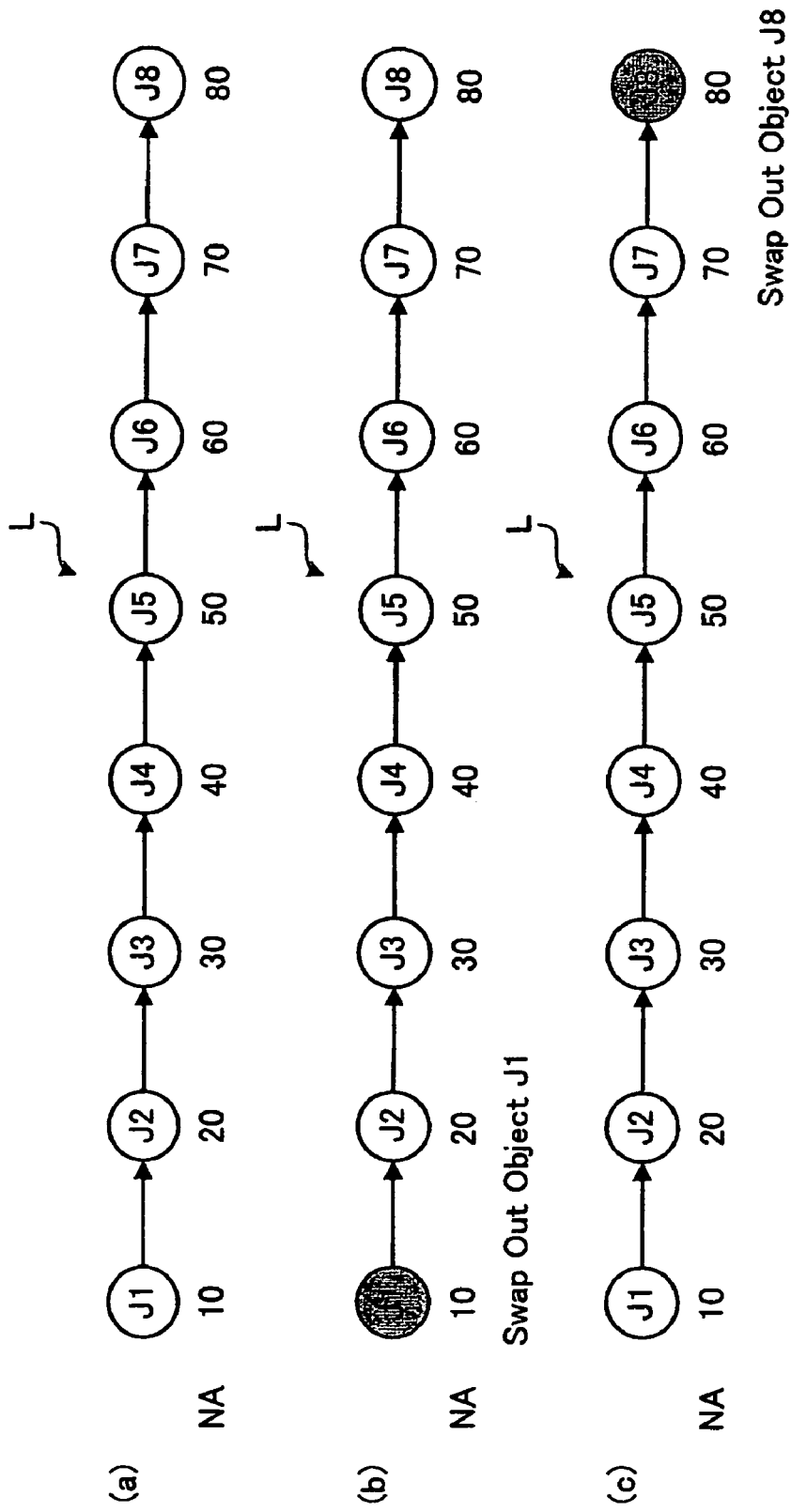
FIGS. 8A is a diagram showing an object array in the initial state.
FIG. 8B is a diagram showing an object array wherein an object is to be swapped out when the current time is 15.
FIG. 8C is a diagram showing an object array wherein an object is to be swapped. out when the current time is 5.

Based on a process request received from a user, the predicted use time NA is calculated when an object held in the memory 32 is used, and is stored in correlation with each object stored in the memory 32. For all the objects stored in the memory 32, the memory management unit 37b generates an object array L, shown in FIG. 8 as an example, beginning with the latest predicted use time NA, and manages the objects based on this object array L.

An explanation will now be given for an object management method employed by the processing unit 37 of the thus arranged server 30.

Figure 9:
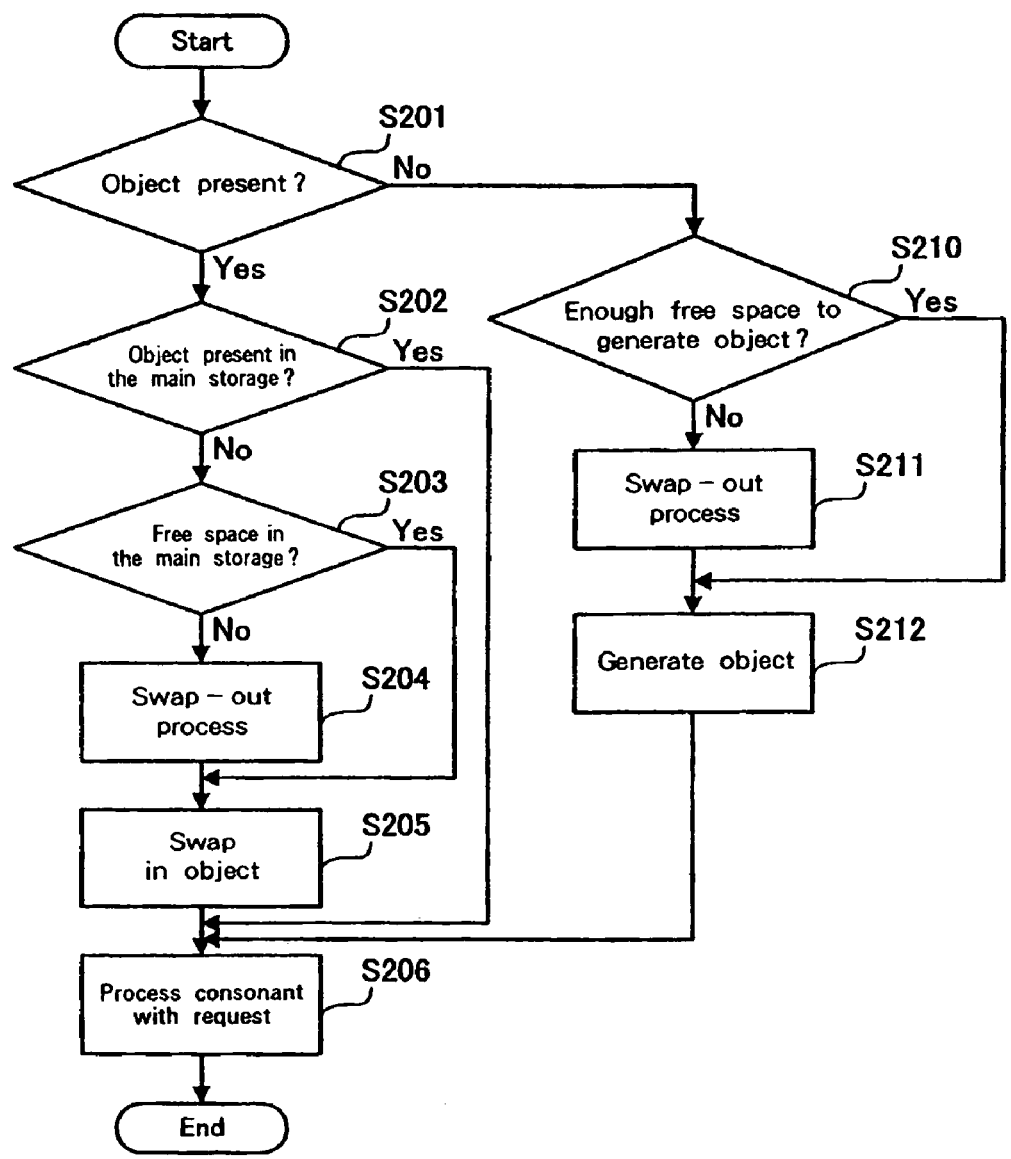
FIG. 9 is a flowchart showing the object management processing.

FIG. 9 is a flowchart showing the basic object management processing performed by the processing unit 37. As is shown in FIG. 9, when a request is issued to the server 30 by the entry at a user terminal 10 of data for a web page presented by the server 30, the server 30 employs the log-in ID entered by the user terminal 10 to determine whether the object corresponding to the log-in ID is already present in the server 30 (step S201). Subsequently, when the object is present, a check is performed to determine whether the object is present in the memory 32 (step S202), and when the object is present in the memory 32, program control advances to step S206 and a process consonant with the request is performed by the processing unit 37.

When the object is not present in the memory 32, at step S203 a check is performed to determine whether there is enough free space in the memory 32 to swap in the object from the hard disk drive 33 to the memory 32. If there is not sufficient space in the memory 32, at step S204 (a swap-out step and an execution step) a swap-out process that will be described later is performed, and at step S205, the object is swapped in from the hard disk drive 33 to the memory 32. When there is sufficient free space, at step S205 the object is swapped in to the memory 32. Then, at step S206, the processing unit 37 uses the object that has been swapped in to the memory 32 to perform a process in accordance with the request received from the user terminal 10.

When it is ascertained at step S201 that the object is not present in the server 30, program control is shifted to step S210, and a check is performed to determine whether there is large enough free space to generate a new object. When there is not enough free space, at step S211 (a swap-out step and an execution step) the swap-out process that will be described later is performed, and at step S212, the object management unit 37a generates a new object in the memory 32. When there is enough free space, at step S212 a new object is generated in the memory 32. Thereafter, at step S206, the processing unit 37 uses the object generated in the memory 32 to perform a process in accordance with the request received from the user terminal 10.

The predicted use time NA obtained by the access prediction unit 39 is employed to perform the swap-out process at step S204 or S211.

Figure 10:
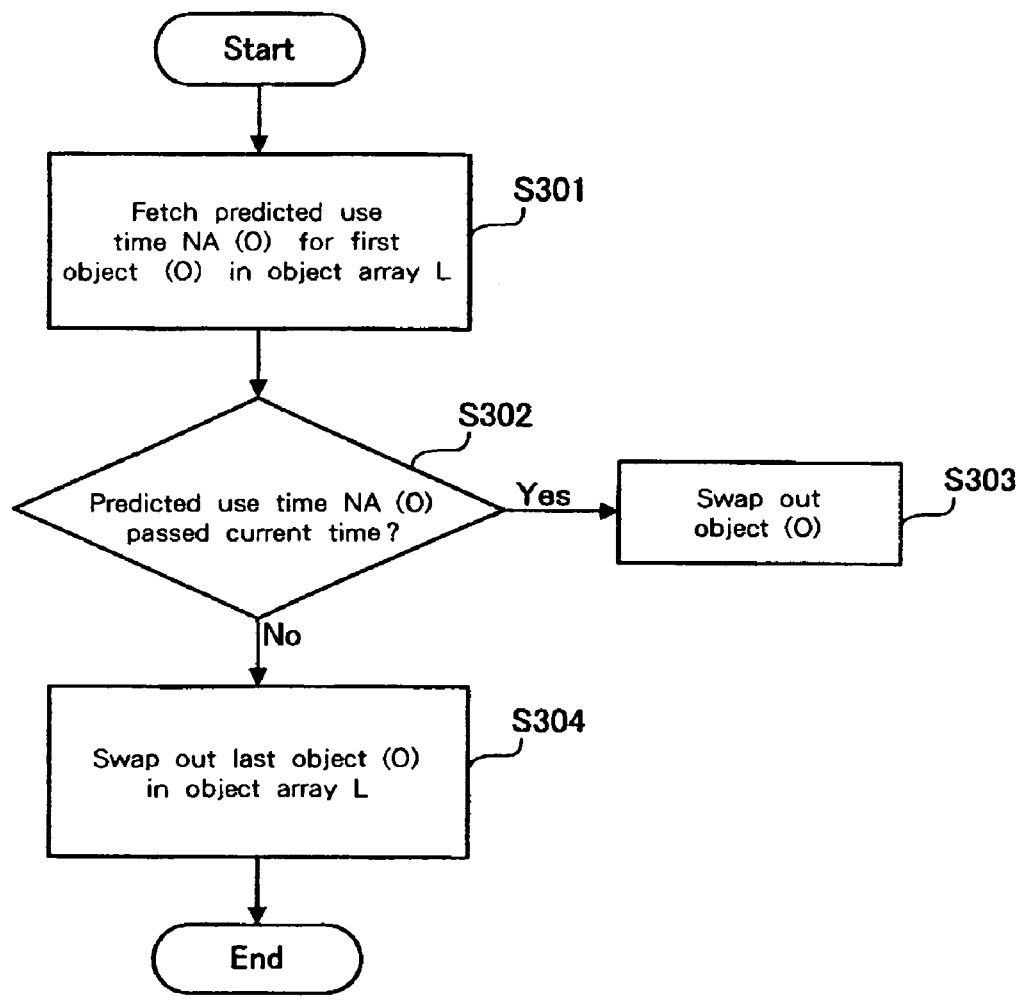
FIG. 10 is a flowchart showing the processing for swapping an object out based on a predicted use time.

FIG. 10 is a flowchart for the swap-out processing. First, the predicted use time NA (O) is fetched for the first object (O) in the array L of the objects arranged in the memory 32 beginning with the earliest predicted use time NA (step S301). A check is then performed to determine whether at the current time, held by an internal clock (not shown), the predicted use time NA (O) has passed (step S302). When at the current time the predicted use time NA (O) has passed, the first object (O) is swapped out (step S303). When at the current time the predicted use time NA(O) has not yet passed, the last object (O) in the object array L (the object having the latest time) is selected (object specification step) and is swapped out (step S304).

As a specific example, the processing in FIG. 10 is performed for the object array L in the state in FIG. 8A when the object swap-out process must be performed. When, the current time TN is 15, as is shown in FIG. 8B, the predicted use time NA(J1)=10 for the first object (J1) of the object array L has passed, so that the condition at step S302 is satisfied and this object (J1) is swapped out. Further, as is shown in FIG. 8C, when the current time TN is 5, the predicted use time NA(J1)=10 for the first object (J1) of the object array L has not yet passed, so that the condition at step S302 is not satisfied and the last object (J8) of the object array L is swapped out.

Figure 11:
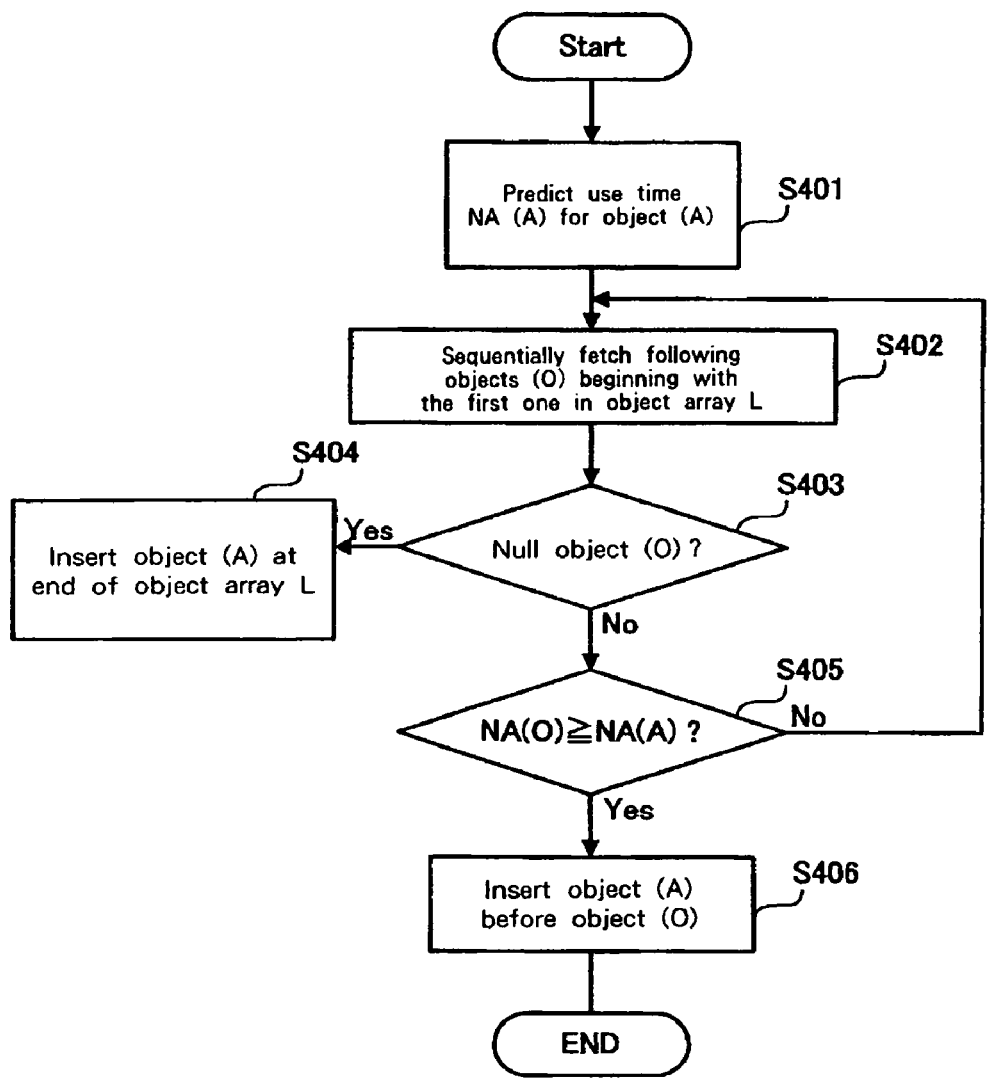
FIG. 11 is a flowchart showing the processing for updating an object array.

FIG. 11 is a flowchart showing a method for updating the object array L in the memory 32 for the swap-in process at step S205 or for the process for generating a new object at step S212.

First, the access prediction unit 39 predicts the use time NA(A) for an object (A) that is to be swapped in or is to be generated (prediction step S401). At this time, as is described above, the characteristics parameter cr set for the user is employed to predict the use time NA(A) for a web page currently being accessed by the user terminal 10.

Next, the first object (O) is fetched from the object array L comprising all the objects stored in the memory 32 (step S402).

A check is then performed to determine whether the fetched object (O) is a null (step S403). When the object (O) is a null, the object (A) in question is inserted at the last of the object array L (step S404). When the fetched object (O) is not a null, at step S405 a check is performed to. determine whether the predicted use time NA(O) for the fetched object (O) is greater than the predicted use time NA(A) for the object (A). When the predicted use time NA(O) is not greater than the predicted use time NA(A), program control returns to step S402, the next object (O) is fetched from the object array L, and the process beginning at the step S403 is repeated.

The objects (O) of the object array L are sequentially examined, and when it is ascertained at step S405 that the predicted use time NA(O) of a specific object (O) is greater than the predicted use time NA(A) of the object (A), the object (A) is inserted before the specific object (O) in the object array L (step S406). Thus, the object (A) that is swapped in or that is generated is inserted into the object array L, and the object array L is updated.

Figure 12:
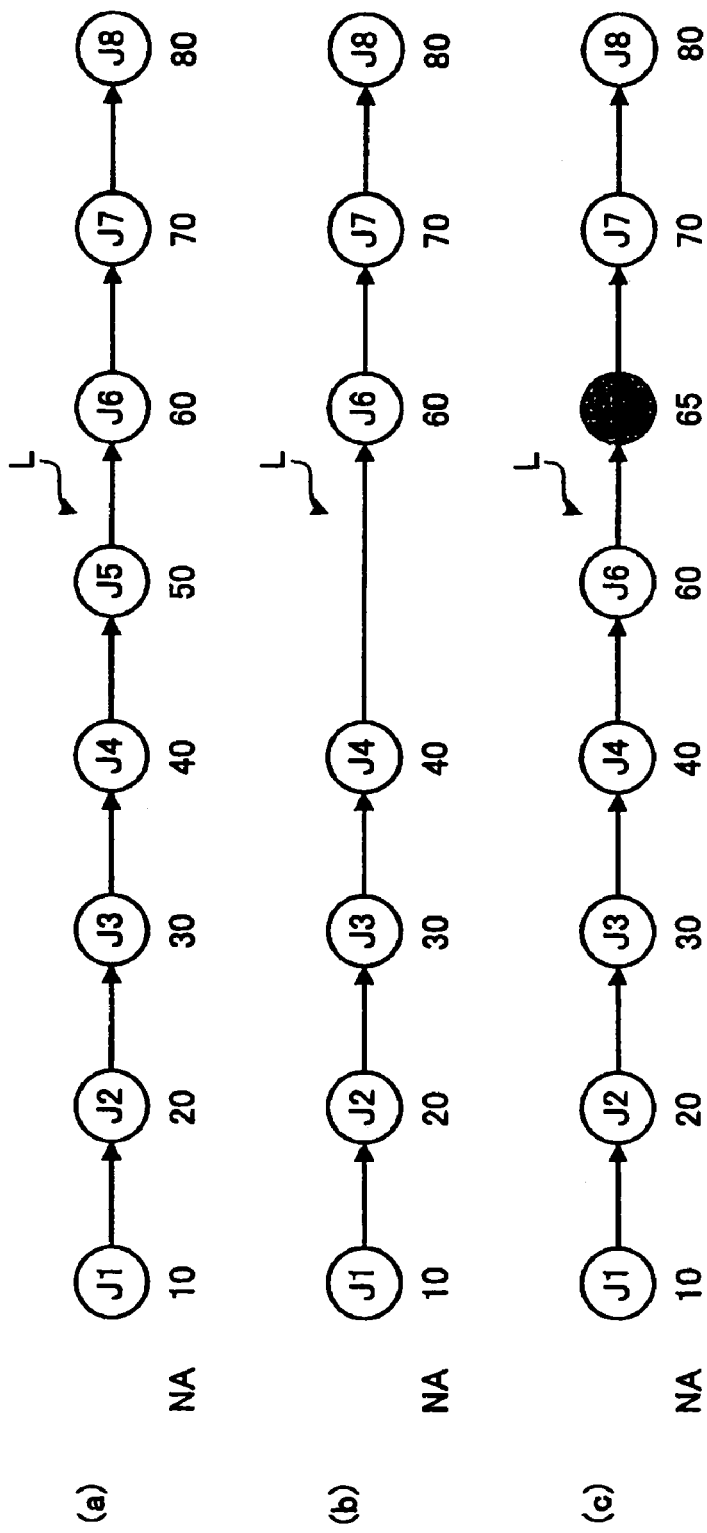

FIGS. 12A and 12B are diagrams showing an example of the updating performed for the object array L. In FIG. 12A the object array L before it is updated is shown, and as is shown in FIG. 12B, based on a request from a user terminal 10, the object (J5) of the object array L in the memory 32 is used (fetched from the object array L), and the time NA(J5) for the next use of the object (J5) is predicted to be NA(J5)=65.

Then, at steps S402, S403 and S405 in FIG. 11, the predicted use time NA(J5) for the object (J5) is compared beginning with the first object (J1) of the object array L. Since the predicted use time NA(J7) for the object (J7) is greater than the predicted use time NA(J5)=65 of the object (J5), and the condition at step S405 is satisfied, as is shown in FIG. 12C, the object (J5) is inserted before the object (J7), and the object array L is updated.

Figure 13:
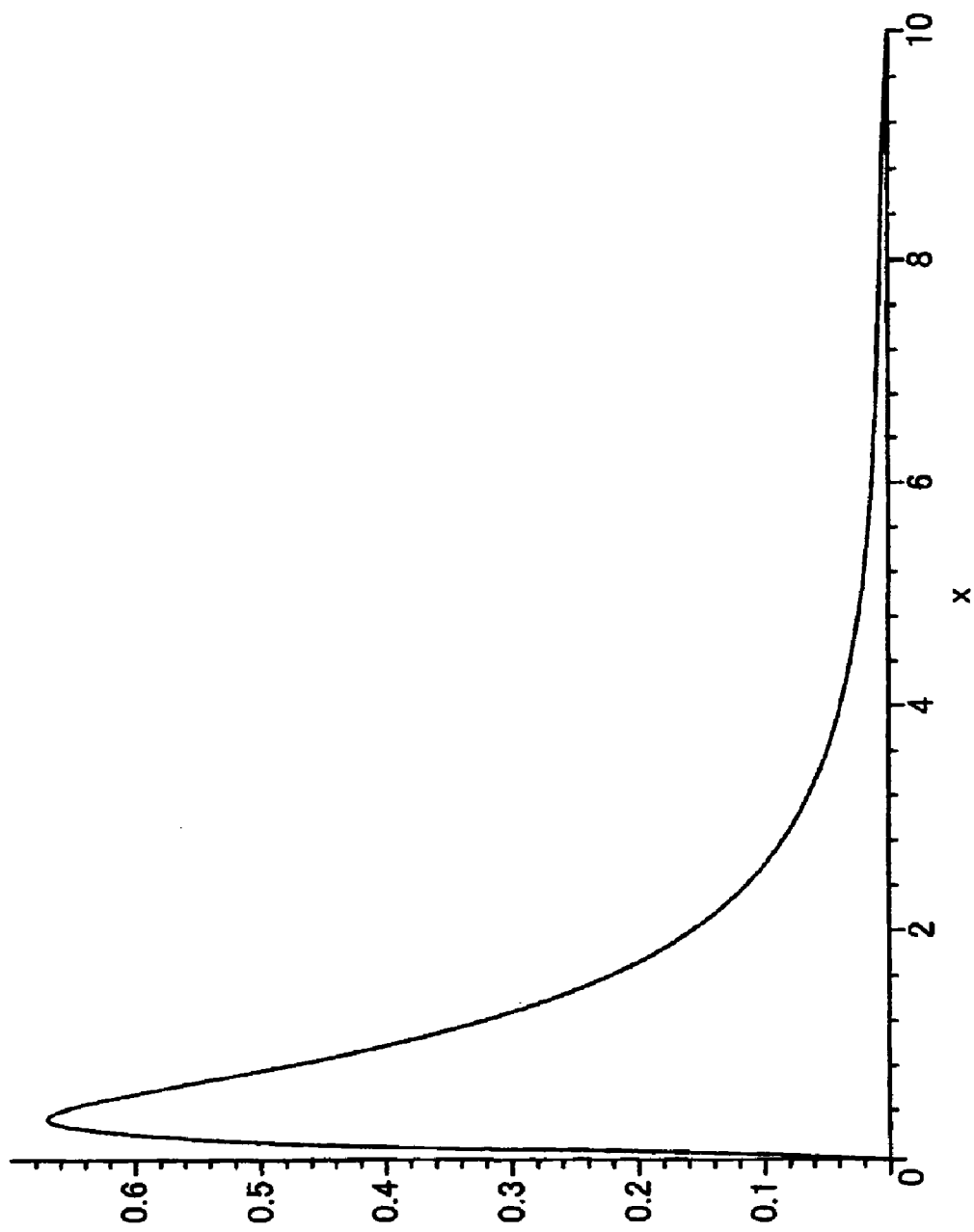
FIG. 13 is a graph showing an example probability distribution for performing a simulation.
Figure 15:
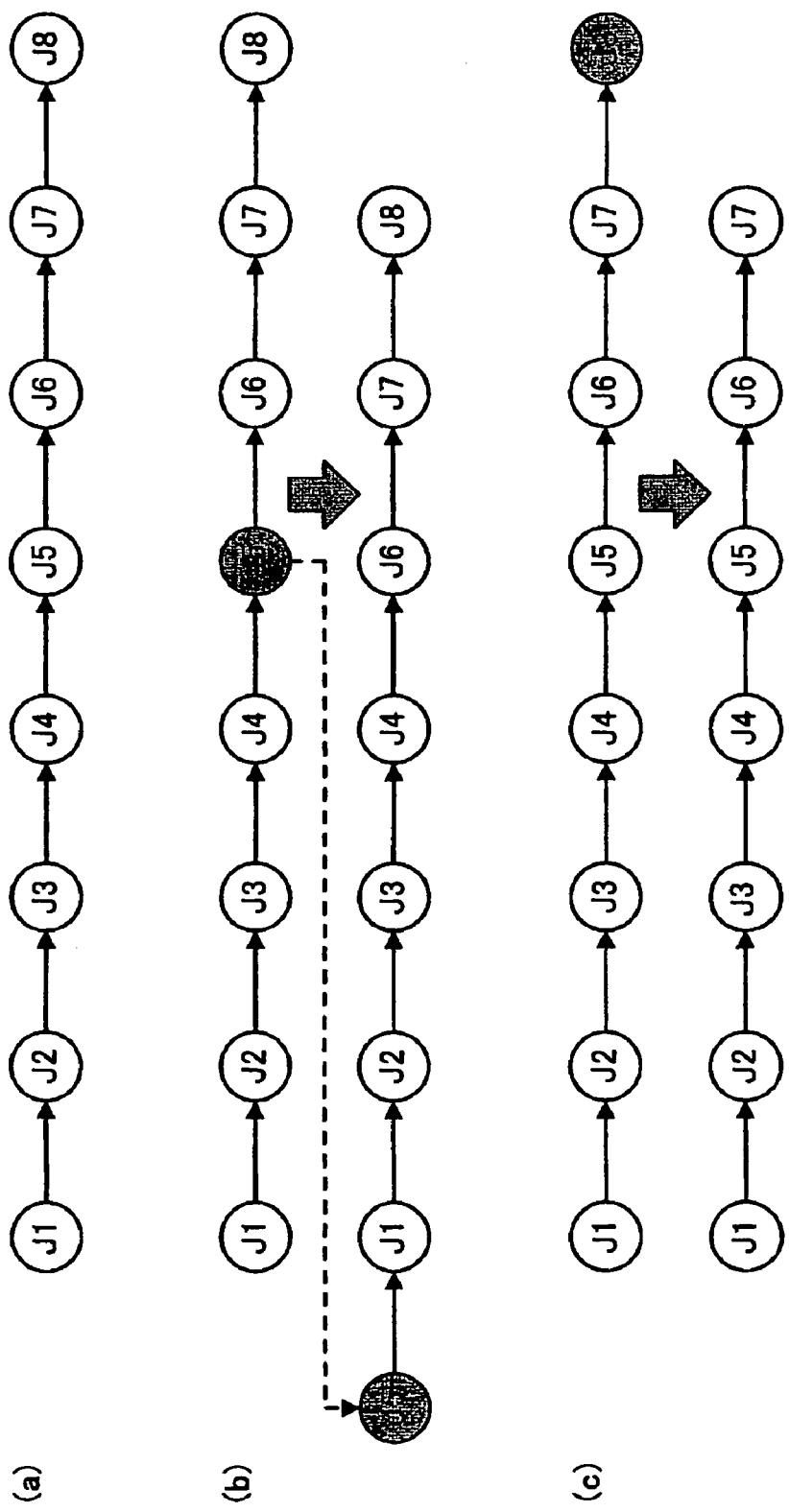
FIG. 15 is a diagram showing a conventional object management method.

Simulations were performed by using the algorithm that employs the predicted use time NA and the conventional LRU algorithm. The results obtained by the comparison of these simulations will now be explained. A log-normal distribution as shown in FIG. 13 is employed as the probability distribution required to predict the response time α for a user. The function f(x) of the log-normal distribution is $$f(x) = \frac{1}{\sqrt{2\pi}\,\sigma x} \exp\left\{\frac{-(\log x - \mu)^2}{2\sigma^2}\right\}$$

when x>0, and f(x)=0 when x≦0, where μ is the average (−∞<μ<∞) and $\sigma^2$ is the variance (σ>0).

The characteristics parameter cr for the users is set to 99%, based on the log-normal probability distribution. Further, assume that server 30, which manages objects based on the algorithm employing predicted use time NA, and a server (not shown), which manages objects based on a conventional LRU-type algorithm (hereinafter referred to as an LRU algorithm), together perform a session with a user terminal 10 by sequentially presenting ten web pages, and that each web page is shifted to the next web page in accordance with a predetermined command entered at the user terminal 10.

In either case, it is assumed that the rate of users that leave off the session halfway is 30% for each web page.

Simulations for the cases which vary in the average number of requests per unit time were performed under the same condition described above. At this time, the ratio of the number of swap-outs that occur in the server 30 that employs the algorithm using the predicted use time NA to the number of swap-outs that occur in the server (not shown) that employs the conventional LRU algorithm (hereinafter referred to as a relative reduction ratio) is defined as:

relative reduction ratio=1 −the number of swap-outs by the algorithm using the predicted use time NA/the number of swap-outs by the LRU algorithm.

FIG. 14 is a table showing the result of the simulations. As the average number of accesses (requests) per unit time is increased, the number of swap-outs for the server 30 that employs the algorithm using the predicted use time NA is reduced compared with that for the server that employs the LRU algorithm. Therefore, it is found that the algorithm using the predicted use time NA is more effective, especially for a server that receives a large number of requests per unit time, i.e., a server that is accessed frequently, since the number of swap-outs becomes relatively smaller.

As is described above, for each web page presented to the user's terminal 10, the server 30 predicts the time whereat the user will issue the next request, i.e., the predicted use time NA for the object stored in the server 30, and manages the objects stored in the memory 32 based on the predicted use time NA. When the swap-out of an object in the memory 32 must be performed, basically the object having the latest predicted use time NA is swapped out. Therefore, only objects having early predicted use times NA, i.e., only objects that will most probably be used in the near future, are present in the memory 32.

According to the conventional LRU method, the swapping out is performed simply by beginning with the object having the oldest last use time. Therefore, each time an object is used, this object is inserted at the top of the object array, and the object having the oldest last use time is swapped out from the tail of the object array. Thus, during a session for a specific user, an object in use may be swapped out for the sake of other objects used for accesses by other users. In this case, the contents of web pages that such other users are accessing are not taken into account at all. Therefore, when this user advances to the next step, the object must be swapped in again after another object has been swapped out, and as a result, unnecessary swap-ins and swap-outs must be performed.

On the contrary, as is described above, since the predicted use time NA is employed, and objects that will highly probably be used in the near future are present in the memory 32, the number of unnecessary swap-ins and swap-outs can be minimized, and the efficiency of the server 30 can be increased. As a result, a user can quickly. obtain a response from the server 30, the factors that cause a user to feel dissatisfied can be reduced, and the quality of the service can be improved.

In addition, since the predicted use time NA is obtained not only by using the characteristics parameter cr that is set based on the skill of each user but also based on the contents of the web page each user is accessing, the time can be predicted more accurately. Furthermore, the history data for the past N hours (e.g., one hour) is extracted and is used for the prediction of the use time NA. Therefore, even when the total number of accesses and the degree of the traffic on the network 20 fluctuate depending on time, this can be taken into account while the prediction is made.

Further, since an object whose predicted use time NA, relative to the current time, has passed is swapped out, an object, such as an object for which a session has been left off, that is present in the memory 32 even though it is not being used can be removed. This can also contribute to efficient object management.

In the above embodiment, the characteristics parameter cr set for each user is used for the algorithm for setting the predicted use time NA. So long as the use time NA can be predicted, another algorithm may also be employed. Further, in the swap-out process, an object whose predicted use time NA has passed is swapped out through the process in FIG. 10. However, the same process may be performed for each predetermined period of time. As a result, free space in the memory 32 can be obtained in advance by swapping out unnecessary objects.

A specific amount of history data for determining the probability distribution is required to predict the use time NA. However, when the server 30 is activated, the history data may not be present or may be insufficient. In this case, the LRU method may be employed until a sufficient amount of history data has been accumulated, and after a satisfactory amount of history data has been accumulated, the employment of the predicted use time NA may be begun.

In addition, in the embodiment, an example wherein the server 30 performs an Internet banking process has been employed. The use of the present invention, however, is not limited to this example, and it can be applied to processing of arbitrary types and contents.

Furthermore, without departing from the scope of the subject of the present invention, the configuration of the embodiment may be rearranged or modified to provide another configuration.

ADVANTAGE OF THE INVENTION

As is described above, according to the invention, the operation efficiency of the server can be increased, and the service provided for a user can be improved.

We claim:

1. A server which employs an object designated for each user to perform a process in accordance with a user request received via a network, said server comprising:
    first object storage means, for storing objects used to perform processes;
    second object storage means, for storing an object transmitted by said first object storage means;
    processing means, for performing a process, upon receiving a request from a user, by using an object stored in said first object storage means, said object becoming a currently used object;
    use time prediction means, for predicting a next use time whereat said currently used object used by said processing means is to be used next by said processing means, said next use time being a predicted time whereat said currently used object is to be used by the processing means based on time data accumulated for multiple users of non-currently used objects and based on time data for the specific user of said currently used object; and
    object management means, for transmitting, based on said time predicted by said use time prediction means, said object by said first object storage means to said second object storage means.

2. The server according to claim 1, wherein said use time prediction means predicts, for each user, the next use time said object will be used, and said object management means is further used for transferring from the first object storage means to the second object storage means objects for which the predicted times have passed.

3. The server according to claim 1, wherein said processing means employs an object to perform a process sequence consisting of multiple steps, and wherein, at each of said steps of said process sequence, said use time prediction means predicts the time for the use of said object.

4. The server according to claim 1, wherein said object management means extracts from said first object storage means and transmits to said second object storage means an object for which the time for use has passed.

5. A computer program product comprising a tangible computer readable medium having computer readable program code means embodied therein for causing functions of a server, which employs an object designated for each user to perform a process in accordance with a user request received via a network, the computer readable program code means in said computer program product comprising computer readable program code means for causing a computer to effect the functions of claim 1.

6. The server according to claim 1, wherein:
  said use time prediction means predicts, for each user, the next use time said object will be used, and said object management means is further used for transferring from the first object storage means to the second object storage means objects for which the predicted times have passed;
  said processing means employs an object to perform a process sequence consisting of multiple steps, and wherein, at each of said steps of said process sequence, said use time prediction means predicts the time for the use of said object; and said object management means extracts from said first object storage means and transmits to said second object storage means an object for which the time for use has passed.

7. A computer system comprising a processor which performs a process in accordance with a request received, via a network, from an external user terminal, said processor comprising:
  a data output unit, for outputting to said user terminal, via said network, data requesting the input of content;
  a request acceptance unit, for accepting data constituting requested content that is input at said user terminal based on said data output by said data output unit;
  a main storage for storing objects generated for individual users;
  a processing unit for employing a currently used object stored in said main storage to perform a process in accordance with said data indicating said requested contents;
  an object management unit for managing objects stored in said main storage; and a time prediction unit, for predicting, following the output of said data by said data output unit, a next use time whereat said processing unit will next employ said currently used object to perform a process, said next use time being a predicted time whereat the currently used object is to be used by the processing means based on time data accumulated for multiple users of non-currently used objects and based on time data for the specific user of said currently used object; and
  wherein, based on said time predicted by said time prediction unit, said object management unit manages said objects stored in said main storage.

8. The computer system according to claim 7, further comprising:
  a time data accumulation unit for accumulating time data required from the time said data output unit outputs data to said user terminal until said processing unit employs an object to perform a process;
  wherein said time prediction unit predicts a time for a specific user based on time data that are accumulated in said time data accumulation unit for multiple users and for said specific user, and said object management unit is further used for transferring from the main storage to a second object storage objects for which predicted times have passed.

9. The computer system according to claim 8, further comprising:
  an index setting unit, for setting an index, for a specific user for whom a time is to be predicted, in a distribution of multiple sets of time data accumulated in said time data accumulation unit,
  wherein said time prediction unit employs said index to predict said time for said specific user.

10. The computer system according to claim 8, wherein said time prediction unit predicts the time for said specific user by employing time data, for multiple users, that have been accumulated in said time data accumulation unit within an immediately preceding specified period of time.

11. The computer system according to claim 7, wherein a process sequence consisting of multiple steps is performed by using an object, and wherein, for each of said multiple steps, said time prediction unit predicts a time whereat said object is to be used the next time.

12. A computer program product comprising a tangible computer readable medium having recorded and computer readable program code means embodied therein for causing functions of a computer system, which performs a process in accordance with a request received, via a network, from an external user terminal, the computer readable program code means in said computer program product comprising computer readable program code means for causing a computer to effect the functions of claim 7.

13. A computer system in accordance with claim 7, and further comprising:
  a time data accumulation unit for accumulating time data required from the time said data output unit outputs data to said user terminal until said processing unit employs an object to perform a process, wherein said time prediction unit predicts a time for a specific user based on time data that are accumulated in said time data accumulation unit for multiple users and for said specific user, and said object management unit is further used for transferring from the main storage to a second object storage objects for which predicted times have passed,
  an index setting unit, for setting an index, for a specific user for whom a time is to be predicted, in a distribution of multiple sets of time data accumulated in said time data accumulation unit, wherein said time prediction unit employs said index to predict said time for said specific user,
  wherein:
  said time prediction unit predicts the time for said specific user by employing time data, for multiple users, that have been accumulated in said time data accumulation unit within an immediately preceding specified period of time;
  a process sequence consisting of multiple steps is performed by using an object; and for each of said multiple steps, said time prediction unit predicts a time whereat said object is to be used the next time.

14. A computer program product comprising a physical computer readable medium having recorded and computer readable program code means embodied therein for causing functions of a computer system, which performs a process in accordance with a request received, via a network, from an external user terminal, the computer readable program code means in said computer program product comprising computer readable program code means for causing a computer to effect the functions of claim 13.

15. A method for managing objects stored in a main storage, said method comprising:
   a prediction step of predicting a next use time whereat a said currently used object stored in said main storage is to be used next, said next use time being a predicted time whereat currently used object is to be used based on time data accumulated for multiple users of non-currently used objects and based on time data for the specific user of said currently used object; and;
   an object designation step of designating the object, of said objects stored in said main storage, for which said use time is the latest; and
   a swap-out step of swapping said designated object out of said main storage.

16. The method according to claim 15, wherein said object designation step and said swap-out step are performed when an object must be swapped out of said main storage in order for another object to be swapped in, or to generate a new object.

17. The method according to claim 15, wherein said swap-out step is performed when said time predicted at said prediction step has elapsed, and further comprising a transferring step for transferring from main storage means to auxiliary storage objects for which the predicted times have passed.

18. The method according to claim 15, wherein, at said prediction step, time is predicted in accordance with a fluctuation over time.

19. An article of manufacture comprising a tangible computer readable medium having recorded and computer readable program code means embodied therein for causing management of objects stored in a main storage, the computer readable program code means in said article of manufacture comprising computer readable program code means for causing a computer to effect the steps of claim 15.

20. A program storage device readable by a computer, tangibly embodying a program of instructions recorded on tangible computer-readable medium and being executable by the computer to perform method steps for managing objects stored in a main storage, said method steps comprising the steps of claim 15.

21. A method for controlling a server that performs a process by using a current object stored in a main storage, said method comprising:
   an output step of outputting the process results in accordance with a process request received from a user who has accessed said server via a network;
   a data accumulation step of storing data for a required response time beginning upon the output of said process results and continuing until a response to said process results is received from a user;
   a prediction step of employing the data accumulated for said response time to predict a next time whereat a response is to be input by said user relative to said process results that are output following the accumulation of said data for said response time, said next time being a predicted time whereat a currently used object is to be used based on time data accumulated for multiple users of non-currently used objects and based on time data for the specific user of said currently used object; and
   an execution step of employing said predicted time to swap an object out of said main storage.

22. The method according to claim 21, further comprising:
   an index setting step of setting an index indicating the position of a response time for a specific user in the distribution, not only for said specific user but also for other users, of response time data accumulated at said data accumulation step, wherein, at said prediction step, time is predicted based on said index.

23. The method according to claim 22, wherein, at said prediction step, a time based on a standard index, which is set in advance, is predicted for a user for whom said index has not been set, and further comprising a transfer step for transferring from main storage to auxiliary storage means objects for which predicted times have passed.

24. The method according to claim 22, wherein said index setting step is performed each time response time data is accumulated at said data accumulation step.

25. A program storage device readable by a computer, tangibly embodying a program of instructions recorded on tangible computer-readable medium and being executable by the computer to perform method steps for controlling a server that performs a process by using an object stored in a main storage, said method steps comprising the steps of claim 21.

26. An article of manufacture comprising a tangible computer readable medium having recorded and computer readable program code means embodied therein for causing control of a server that performs a process by using an object stored in a main storage, the computer readable program code means in said article of manufacture comprising computer readable program code means for causing a computer to effect the steps of claim 21.

27. A computer program recorded on tangible computer-readable medium, said computer program permits a computer, which employs an object stored in main storage to perform a process in accordance with a request received from an external terminal, to perform:
   a process for detecting a process request command issued by said external terminal;
   a process for outputting data for process results in accordance with said process request command;
   a process for predicting a next use time whereat said external terminal will enter in said process results the next process request command, said next use time being a predicted time whereat a currently used object is to be used based on time data accumulated for multiple users of non-currently used objects and based on time data for the specific user of said currently used object; and
   a process, based on said timing, for managing an object that is required to perform a process in accordance with said next process request command.

28. The computer program according to claim 27, which further permits said computer to swap out of said main storage an object, stored in said main storage, for which said predicted timing is the latest.

29. A computer program recorded on tangible computer-readable medium, said computer program permits a computer, which employs an object stored in main storage to perform a process in accordance with a request received from an external terminal, to perform:
   a process for predicting a next use time whereat each of the objects stored in said main storage is to be used next, said next use time being a predicted time whereat a currently used object is to be used based on time data accumulated for multiple users of non-currently used objects and based on time data for the specific user of said currently used object; and;

a process for designating an object, one of said objects in said main storage, for which said use time is the latest; and a process for swapping said designated object out of said main storage.

30. A system for a process using objects comprising a plurality of user terminals connected via a network, such as the Internet or a LAN, to a server comprising at least one computer of a service provider, said terminals being Personal Computers comprising:

a function for receiving data from the server via the network;

a browser function for displaying on a display screen of a monitor an image based on received data;

a data input function, such as is provided by a pointing device or a keyboard, enabling a user to enter information and a request based on the contents of the display screen; and a function for transmitting to the server via the network, information entered using the data input function;

said server comprising:

a control block, for performing a process based on CPU instructions based on a control program installed in advance;

a memory being first object storage means, or main storage device, such as Dynamic Random Access Memory;

a hard disk drive being second object storage means or an auxiliary storage device; and a data transmitter/receiver, for transmitting and receiving data via the network;

said control block comprising:

a request acceptance unit, for accepting a request issued by an external terminal and received via the network, by the data transmitter/receiver;

a processing unit, for performing a process in accordance with the received request; and a process result transmitter being a data output unit, for transmitting to the terminal a process result obtained by the processing unit via the data transmitter/receiver and the network; and said processing unit comprising:

an object management unit, for retrieving a required object from the memory, or for generating a new object, in order to perform a process in accordance with the request;

a memory management unit being object management means or an object management unit, for managing objects in the memory, including swapping out an object from the memory to the hard disk drive, or swapping in an object from the hard disk drive to the memory, when objects are managed by the memory management unit, the processing unit predicts a next time an access will occur during a process sequence session performed for a user, and the control block further comprises an access prediction unit being use time prediction means or a time prediction unit, said server performs the process requested by the user as a series of multiple steps, by the server 30 providing:

homepages for the user's terminal, connected via the network to the server, and web pages that correspond to individual steps of the process.

31. A system for a process using objects as recited in claim 30, employed for Internet banking, in accordance with an entry received from the user terminal, said server sequentially presents:

a web page for accepting log-in ID and password entries, a web page for accepting a process menu being a money transfer or an account balance inquiry selected by a user following the log-in, a web page for accepting the entry of information being an account number for the money transfer destination, and an amount of money to be transferred required for execution of the process in accordance with a selected process menu, a web page for receiving from the user a confirmation for the process contents, and a web page for providing notification that the process has been completed.

32. A system for a process using objects as recited in claim 31, wherein in the server 30, therefore, based on a process request command and parameters included in the request, being request contents data, received by the request acceptance unit, the processing unit performs a predetermined process and presents the results to the user, and the process result transmitter transmits data for a web page that permits the user to enter the request contents for a next process step.

33. A system for a process using objects as recited in claim 32, wherein data for displaying the web pages on the terminal is stored on the hard disk drive of the server, and the process results transmitter reads, from the hard disk drive, data for a web page to be transmitted, being Hypertext Markup Language data, and the data transmitter/receiver transmits this Hypertext Markup Language data, together with process result data provided by the processing unit, to the terminal via the network 20.

34. A system for a process using objects as recited in claim 33, wherein the access prediction unit predicts a response time each user will access the next web page to each web page presented by the server, said response time being predicted that extends from a time whereat the server transmits the data for a web page to the use time, whereat the terminal, which receives the data, displays the web page and the user, by reading the web page and completing the requested items thereon, and transmits to the server via the terminal, a command that the server responds to by using an object for the user.

* * * * *